UNITED STATES PATENT OFFICE 2,628,228

SULFUR-CONTAINING PLASTICIZING COMPOSITION

Robert Gardner King, Norwalk, Conn., assignor to King Organic Chemicals, Inc., Norwalk, Conn., a corporation of Connecticut No Drawing. Application February 26, 1949, Serial No. 78,677

6 Claims. (Cl. 260—139)

This invention relates to new compositions useful for the plasticizing of crude rubber—both natural and synthetic—and for the reclaiming of vulcanized or scorched rubber—both natural and synthetic. The new compositions are of particular value for the reclaiming of scorched or vulcanized rubbers giving, when used for that purpose, reclaimed rubbers of a quality more nearly approaching that of raw or crude rubber than the reclaimed rubbers which have been commonly available heretofore.

The compositions of the present invention are reaction products of high-boiling aromatic hydrocarbons, in particular methylated napthalenes, with sulfur chloride, obtained by direct reaction of a highly aromatic hydrocarbon of relatively high-boiling range with sulfur chloride, with elimination of hydrogen chloride and production of a product which is substantially free from chlorine and acid, has a substantial sulfur content, and is highly effective for the plasticizing of crude rubbers and the reclaiming of vulcanized rubber. Available information indicates that the aromatic oils which are most useful for the production of the products of the invention consist of as high as 90% of methylated naphthalenes, including the di-, tri-, and tetramethyl naphthalenes, with perhaps some dinaphthalene, naphthalene, acenaphthene and other hydrocarbons. These highly aromatic products are obtained by solvent extraction, by the use of sulfur dioxide, furfural, dichlorethyl ether or other of the solvents commonly used as solvents for aromatics, of the cracked hydrocarbons with distillation to obtain a product of boiling range proper to include the methylated naphthalenes.

Particularly useful products are the highly aromatic hydrocarbon fractions with a boiling range of about 500 to about 650° F., obtained as fractions from a two-pass catalytic cracking operation. Because of the severity of the cracking operation to which these products have been subjected, it is improbable that they contain any significant amount of alkylated aromatic hydrocarbons in which the alkyl group is other than methyl, and the boiling range is such as to indicate the substantial absence of substituted benzenes. One such product which is highly useful is that sold by the American Mineral Spirits Company as AMSCO SOLV HLA (AIS). This product has an A. P. I. gravity at 60° F. of 11.2, specific gravity at the same temperature of .9916, initial boiling point of 500° F., 10% boiling point of 518° F., 50% boiling point of 538° F., 90% boiling point of 569° F., end point of 650° F., flash point 255° F., mixed aniline point 62° F., average molecular weight 158, viscosity S. U. at 100° F. of 37.6, and kinematic viscosity at 100° F. of 3.50 centistokes. This product is considered to consist essentially, i. e., circa, 90%, of polymethylated naphthalene, and is obtained as a fraction from the product of a two-pass catalytic cracking operation. Another very useful product is one listed as Socony Vacuum Oil 544B, having a specific gravity of 0.985, boiling range of 520 to 630° F., aromatic content, 95%, and refractive index 1.5916, considered to be at least 95% alkylated naphthalene, predominantly tri- and tetramethyl naphthalene.

To prepare the new compositions of the invention from oils of this character, the oils are treated at relatively low temperatures with sulfur chloride. The reaction is exothermic, and the reaction mixture is agitated and cooled to maintain the temperature at a relatively low level, for example, below 45° C. advantageously between 30 and 40° C. Hydrogen chloride is given off during the reaction, and is removed from the reaction vessel and absorbed in water or otherwise suitably disposed of. When the reaction has proceeded substantially, the temperature is raised to complete it and the product is blown with air or otherwise treated to remove acid. If desired, the product so obtained may be further treated with caustic and washed to remove any small amounts of sulfur or acid which are present.

The reaction does not appear to go to completion in the sense that all of the aromatic material present reacts with sulfur to produce some type of sulfur-containing product, and for that reason the normal product of reaction appears to be an admixture of unreacted hydrocarbon and the reaction product which is the effective plasticizing or reclaiming agent of the invention. The product obtained having some unreacted hydrocarbon in it, may be used as such, or in admixture with other materials such as pine tar or the like, or may be converted to a more concentrated, and more effective pound for pound product by subjecting it to distillation to remove a substantial proportion of the unreacted hydrocarbon, which may then be recycled to the sulfur chloride reaction.

The production of the new products will be illustrated by the following examples but the invention is not limited thereto.

Example 1

5000 lbs. of aromatic oil described above are introduced into a closed reaction vessel fitted with an agitator, sparging ring, introduction pipe and a further pipe leading to a hydrogen chloride absorption system and cooling and heating coils. Over a period of 2 to 4 hours 750 lbs. of sulfur monochloride are added, with agitation and while passing cold water through the coils to maintain the temperature between 30 to 40° C. As hydrogen chloride is evolved during the reaction, the rate of addition of sulfur monochloride must be relatively slow to keep the batch from boiling over. When all of the sulfur monochloride has been added, the mixture is heated over a 2 hour period to 100° C. and blown with dry air. The resulting product has an acid number between 2 and 3. It is then transferred to another vessel equipped with steam coils, an agitator and a reflux condenser and treated with from 200 to 300 gallons of water and 100 to 200% excess caustic soda over that required to neutralize the acid present. The batch is refluxed for two hours, then cooled and allowed to separate into layers, the oily portion being drawn off and dried. In one operation 5300 lbs. of product were obtained. This product was an effective plasticizing and reclaiming agent as will be shown by subsequent examples.

While in this example the operations of blowing the product with air and subsequently treating with caustic to reduce the acid content is described, it is to be understood that these operations are not essential in that effective though less desirable products are obtained without such treatment subsequent to the reaction of the oil with the sulfur monochloride.

Example 2

500 gallons of the aromatic oil are treated with 450 lbs. of sulfur chloride, in accordance with the procedure described in Example 1. The final washed and alkali treated product is then distilled under vacuum to a still pot temperature of 160° C. About 40% of the product comes off as overhead in this distillation operation. This is recycled to the sulfur monochloride reaction, while the residue forms the active plasticizing or reclaiming agent.

The quantity of sulfur chloride which is used in treating the highly aromatic oils to produce the compositions of the invention may vary from as little as about 5% to as high as about 40%. Amounts in the range of 10 to 20% appear to give the products having the most advantageous properties from a standpoint of use in the treatment of rubber, and it appears to be better to use a quantity of sulfur monochloride in this range, and if a more concentrated product than that produced is desired, to concentrate the product by distilling off unreacted hydrocarbon, than it is to increase the concentration of the active material in the final product by the use of higher proportions of sulfur monochloride. Use of the smaller proportions in the neighborhood of 5 to 10% gives products which are less desirable because of the relatively large content of unreacted hydrocarbon which they have.

For plasticizing crude rubbers or reclaimed vulcanized rubbers, the products of the invention are used in accordance with customary practices. Thus, for reclaiming, the products may be used in the alkali, zinc chloride, acid digestion and pan processes, as well as in the working processes in which the vulcanized rubber is worked, for example, in a Banbury mixer, with the reclaiming agent. For plasticizing crude or raw rubbers, the materials may be used in much the same way that plasticizing agents are commonly used, i. e., may be incorporated in master batches in Banbury mixers, or may be added to the batch on the mill, may be added first with the carbon black, or other pigment, or filler, or at the end of the mixing operation with the sulfur, accelerator, etc., or portions may be added in the early stages of the mixing operation and more added toward the end. The essential function of the agents when used for the treatment of crude or raw rubbers, whether synthetic or natural, is to improve the plasticity of the stock to be vulcanized. In many cases, in addition to improvements in plasticity, the physical properties of the vulcanisate, such as tensile and modulus, are improved, although this result is not always obtained. In general, the products when incorporated in the rubbers seem to lessen the tendency of the rubber to scorch.

The use of the new compositions of the invention will be illustrated by the following examples, but it is not limited thereto.

Example 3

Into a laboratory type high speed Banbury mixer is introduced 1600 grams of ¼" mesh ground whole tire scrap, made from half natural and half GRS rubber tires. 32 grams of the composition of Example 1 is then added and the mixer started. Sufficient pressure is applied to cause the temperature to rise to 450° F. in 3 to 4 minutes. The cooling water is then turned on and the temperature maintained at 450 to 480° F. for 2 to 4 minutes more. The speed of the mixer is now cut to one-quarter of its high speed and the batch cooled to 300° F. or below and discharged to the refiner where 1 to 2 passes gives a high quality of reclaimed product.

Example 4

The procedure of Example 1 is duplicated except that instead of adding 32 grams of the new composition, 16 grams of it and 16 grams of pine tar are added. A good product is obtained.

Example 5

To the Banbury mixer is charged 1600 grams of GRS whole tire scrap and 96 grams of the same reclaiming composition. The temperature of working is somewhat higher, 500 to 525° F., but the procedure is otherwise the same as Example 3. A high quality product is obtained.

Example 6

1650 grams of GRS whole tire scrap—¼" mesh—are charged to the Banbury mixer and 82 grams of the composition of Example 1 are added and the mixer is started. The temperature is allowed to rise to 500 to 510° F. and maintained at that level by suitable cooling for 1 to 2 minutes. The mixture is then slowed down and cooled to 300° F. and the batch discharged to the refiner. Two passes through the refiner gives a somewhat coalescent high quality sheet.

The composition of Example 2 was used as a plasticizing agent in a series of rubber batches, made with GRS rubber and with natural rubber, using conventional mixing and curing techniques, with a cure temperature of 290° F. The operations and results are summarized in the following tables, in which the composition of Example 2 is identified as comp. 2.

| Compound | 1 | 2 | 3 | 4 |
|---|---|---|---|---|
| To Banbury: | | | | |
| GRS, X 485 | 100 | | | |
| GRS, Reg | | | 100 | 100 |
| Smoked Sheet | | 100 | | |
| Softener | | | 10 | 10 |
| Comp. 2 | | | | 3 |
| ZnO | 5 | 5 | 5 | 5 |
| Stearic Acid | 1 | 4 | 1 | 1 |
| Carbon Black | 47 | 50 | 50 | 50 |
| On Mill: | | | | |
| Captax | | 1 | | |
| Sulfur | 2 | 3 | 1.6 | 1.6 |
| Altax | 1.5 | | 1.5 | 1.5 |
| Ethyl Zimate | 0.1 | | 0.1 | 0.1 |
| Comp. 2 | 2 | 2 | 3 | |
| Modulus, 300%: | | | | |
| 15 min | 375 | 1,230 | 95 | 146 |
| 30 min | 1,365 | 1,640 | 389 | 510 |
| 45 min | 1,945 | 1,750 | 722 | 686 |
| 60 min | 2,160 | 1,780 | 944 | 955 |
| Tensiles: | | | | |
| 15 min | 1,455 | 4,100 | 151 | 240 |
| 30 min | 3,590 | 4,350 | 1,480 | 1,650 |
| 45 min | 3,850 | 4,150 | 2,250 | 2,320 |
| 60 min | 3,980 | 4,040 | 2,490 | 2,340 |
| Elongations: | | | | |
| 15 min | 850 | 634 | 687 | 670 |
| 30 min | 640 | 605 | 705 | 680 |
| 45 min | 525 | 560 | 625 | 610 |
| 60 min | 485 | 552 | 577 | 550 |
| Mooney Scorch Tests: | | | | |
| Scorch begins, min | 20 | 8 | 57 | 45 |
| 3-Point Rise, min | 8 | 5 | 19 | 15 |
| Total Time, min | 28 | 13 | 76 | 60 |
| Rate Rise Last min. degrees | ½ | 1 | ½ | ½ |
| Plasticity | 48 | 49.0 | 44.0 | 45.0 |

From the results shown in the foregoing tables, it will be evident that the composition of the invention, while beneficial and useful with natural rubber, is outstanding when used in the compounding of stocks from GRS.

*Example 7*

Into a jacketed autoclave equipped with an agitator are charged 1000 gallons of 5% caustic soda solution, 5000 lbs. of whole tire scrap which has been demetalized and 100 lbs. of the sulfur chloride treated oil of Example 2. Steam is turned into the jacket and the temperature of the batch is maintained at 370–390° F. for from 8 to 24 hours. At the end of the digestion period the entire charge of rubber particles is allowed to cool to about 240° F., after which it is discharged into a 4000 gallon tank containing 2000 gallons of water. The diluted batch is agitated thoroughly and then discharged onto continuous screens where a series of water sprays wash the rubber free from digester liquor and decomposed fabric. The rubber is then conveyed to a dewatering press which partially dries the rubber by squeezing the water out. The partially dried rubber is fed onto a moving screen type air dryer which removes additional moisture to the extent required, usually about 6%. The resulting rubber reclaim is blended on a large mill with reinforcing and processing agents and then refined, giving a suitable commercial reclaim.

*Example 8*

500 lbs. of finely ground (30 mesh) rubber scrap, free from metal and fabric, are blended in an open mixer with 10 lbs. of the sulfur-chloride treated oil of Example 2. The mixture is then placed in open pans and placed inside a vessel into which live steam is introduced in the usual way. In one case a product was obtained after 2 hours which yielded good quality reclaim after milling and refining.

I claim:

1. The process of producing an agent effective in the plasticizing of rubber which comprises gradually adding to a highly aromatic hydrocarbon fraction consisting predominantly of methylated naphthalenes an amount of sulfur chloride from about 5 to about 40% based on the highly aromatic hydrocarbon at a temperature below about 45° C., subsequently heating the resulting mixture to complete the reaction between the sulfur chloride and the hydrocarbon and removing acid liberated in the reaction.

2. The process of producing an agent effective in the plasticizing of rubber which comprises gradually adding to a highly aromatic hydrocarbon fraction consisting predominantly of methylated naphthalenes an amount of sulfur chloride from about 10 to about 20% based on the highly aromatic hydrocarbon at a temperature below about 45° C., subsequently heating the resulting mixture to complete the reaction between the sulfur chloride and the hydrocarbon and removing acid liberated in the reaction.

3. The process according to claim 1 in which, after the reaction of the sulfur chloride with the hydrocarbon, the reaction product is subjected to a distillation operation to remove unreacted hydrocarbon.

4. The process according to claim 2 in which, after the reaction of the sulfur chloride with the hydrocarbon, the reaction product is subjected to a distillation operation to remove unreacted hydrocarbon.

5. A methylated naphthalene sulfide product effective as a plasticizing agent for rubber, containing as an active ingredient the reaction product of a highly aromatic hydrocarbon fraction having a boiling point in the range of 500° F. to 650° F. and containing a predominating proportion of methylated naphthalenes with from 5 to 40% of sulfur chloride, said product being substantially free from chlorine and containing methylated naphthalene sulfides as the main reaction product.

6. A methylated naphthalene sulfide product effective as a plasticizing agent for rubber, containing as an active ingredient the reaction product of a highly aromatic hydrocarbon fraction having a boiling point in the range of 500° F. to 650° F. and containing a predominating proportion of methylated naphthalenes with from 10 to 20% of sulfur chloride, said product being substantially free from chlorine and containing methylated naphthalene sulfides as the main reaction product.

ROBERT GARDNER KING.

REFERENCES CITED

The following references are of record in the file of this patent:

UNITED STATES PATENTS

| Number | Name | Date |
|---|---|---|
| 2,064,580 | Williams | Dec. 15, 1936 |
| 2,153,141 | Engel | Apr. 4, 1939 |
| 2,369,667 | Fox | Feb. 20, 1945 |
| 2,402,645 | Lazier et al. | June 25, 1946 |

OTHER REFERENCES

Lorand, Ind. and Eng. Chem., June 1927, pages 733–735.